(12) United States Patent
Haimin et al.

(10) Patent No.: US 10,638,564 B2
(45) Date of Patent: Apr. 28, 2020

(54) RETROFIT LIGHT EMITTING DIODE, LED, TUBE FOR ENABLING STEP DIMMING IN A MULTILAMP LUMINAIRE LIGHTING SYSTEM

(71) Applicant: SIGNIFY HOLDING B.V., Eindhoven (NL)

(72) Inventors: Tao Haimin, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/329,804

(22) PCT Filed: Sep. 18, 2017

(86) PCT No.: PCT/EP2017/073482
§ 371 (c)(1),
(2) Date: Mar. 1, 2019

(87) PCT Pub. No.: WO2018/054841
PCT Pub. Date: Mar. 29, 2018

(65) Prior Publication Data
US 2019/0208593 A1    Jul. 4, 2019

(30) Foreign Application Priority Data

Sep. 22, 2016   (EP) ..................................... 16190215

(51) Int. Cl.
*H05B 33/08*   (2020.01)
*F21K 9/27*    (2016.01)
*H05B 37/02*   (2006.01)
*H05B 41/38*   (2006.01)
*F21Y 115/10*  (2016.01)

(52) U.S. Cl.
CPC ........... *H05B 33/0815* (2013.01); *F21K 9/27* (2016.08); *H05B 33/0824* (2013.01); *H05B 33/0884* (2013.01); *H05B 37/0272* (2013.01); *H05B 41/38* (2013.01); *F21Y 2115/10* (2016.08)

(58) Field of Classification Search
CPC .......................... H05B 33/0815; H05B 41/38; H05B 37/0272; H05B 33/0824; H05B 33/0884; F21K 9/27; F21Y 2115/10
USPC ....................................................... 315/291
See application file for complete search history.

(56) References Cited

U.S. PATENT DOCUMENTS

| 9,618,185 B2 * | 4/2017 | Ricci ......................... F21V 9/06 |
| 9,769,890 B1 * | 9/2017 | Xiong ................. H02M 1/4241 |
| 2009/0122580 A1 * | 5/2009 | Stamm .................... H02M 7/15 363/44 |
| 2010/0134035 A1 | 6/2010 | Shertok et al. |

(Continued)

FOREIGN PATENT DOCUMENTS

| EP | 2922369 A1 | 9/2015 |
| WO | 2007066252 A1 | 6/2007 |

(Continued)

*Primary Examiner* — Don P Le
(74) *Attorney, Agent, or Firm* — Daniel J. Piotrowski

(57) ABSTRACT

A retrofit Light Emitting Diode, LED, tube to be used in a multi lamp luminaire system is presented, which LED tube comprises a controllable switch circuit arranged to short circuit the LED array of the LED tube such that the LED array does not emit light and such that the current path in the multi lamp luminaire system is not interrupted.

13 Claims, 7 Drawing Sheets

(56) References Cited

U.S. PATENT DOCUMENTS

2015/0198290 A1    7/2015   Segers et al.
2019/0098716 A1*   3/2019   DeJonge ............ H05B 33/0851
2019/0208593 A1*   7/2019   Haimin .............. H05B 33/0884

FOREIGN PATENT DOCUMENTS

WO     2012052875 A2    4/2012
WO     2013082746 A1    6/2013
WO     2016145264 A1    9/2016

* cited by examiner

RETROFIT LIGHT EMITTING DIODE, LED, TUBE FOR ENABLING STEP DIMMING IN A MULTILAMP LUMINAIRE LIGHTING SYSTEM

CROSS-REFERENCE TO PRIOR APPLICATIONS

This application is the U.S. National Phase application under 35 U.S.C. § 371 of International Application No. PCT/EP2017/073482, filed on Sep. 18, 2017, which claims the benefit of European Patent Application No. 16190215.0, filed on Sep. 22, 2016. These applications are hereby incorporated by reference herein.

FIELD OF THE INVENTION

The present invention generally relates to the field of lighting and, more specifically, to a retrofit Light Emitting Diode, LED, tube. The present invention further relates to a multi lamp luminaire lighting system comprising a high frequency electronic ballast at least one fluorescent lamp and at least one retrofit LED tube, and to a method of operating a retrofit LED tube.

BACKGROUND OF THE INVENTION

Lighting devices have been developed that make use of Light Emitting Diodes, LED's, for a variety of lighting applications. Owing to their long lifetime and high energy efficiency, LED lamps are nowadays also designed for replacing traditional fluorescent lamps, i.e. for retrofit applications. For such an application, a retrofit LED tube is typically adapted to fit into the socket of the respective lamp fixture to be retrofitted. Moreover, since the maintenance of a lamp is typically conducted by a user, the retrofit LED tube should ideally be readily operational with any type of suitable fixture without the need for re-wiring the fixture.

Such a retrofit LED tube is, for example, disclosed in US 2015/0198290. Here, an LED lamp arrangement is disclosed for replacing a fluorescent lamp in a luminaire having a ballast for supplying power to the lamp. The LED lamp arrangement comprises a plurality of LEDs arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration.

One of the drawbacks of the retrofit LED tubes is related to step dimming. Step dimming is commonly applied in professional applications such as warehouses, where a multi lamp luminaire lighting system is switched between full light output in case of occupancy and background light level in case of no occupancy. In these applications, the lighting is often not switched off during operating hours due to safety reasons. In the off-hours, the power to the entire system is switched off from a central location with, for example, a cabinet-based sweep timer.

On many legacy ballasts fitted lamps it is not possible to dim a LED tube lamp below a certain amount of light level. As below a certain amount of light level the power factor correction of the ballast gets instable, as the ballasts are not designed to function in an open circuit, i.e. without a lamp connected to it. In addition it is difficult with these known ballasts to enter stand-by mode for all loads running in idle state. The reason is that the ballast has open and short circuit protective circuitry.

SUMMARY OF THE INVENTION

It would be advantageous to achieve a retrofit Light Emitting Diode, LED, tube that enables step-dimming in a multi lamp luminaire lighting system, as well as a multi lamp luminaire lighting system comprising at least one of such a retrofit LED tube, at least one fluorescent lamp and the high frequency electronic ballast. It would also be desirable to achieve a method of operating a LED tube, or system, such that it supports step-dimming.

To better address one or more of these concerns, in a first aspect of the invention, a retrofit Light Emitting Diode, LED, tube for use in a multi lamp luminaire is arranged to be powered from a single high frequency ballast is presented. The retrofit LED tube comprises:
  an LED array for emitting light;
  a power rectifier having an input and an output, wherein the rectifier is arranged to receive an AC supply voltage at its input, in use, to convert said AC supply voltage to a DC voltage, and to provide said DC voltage, via its output, to said LED array;
  a controllable switch circuit arranged to short circuit said LED array such that the LED array does not emit light;
  a control unit arranged for wirelessly receiving a dimming command and for controlling said controllable switch circuit based on said received dimming command.

It was the insight of the inventors that step-dimming is enabled in a multi lamp luminaire lighting system whenever one of the lamps in the lighting system can be short circuited. In case of, for example, two lamps, i.e. a fluorescent tube and a LED tube according to the present invention, are connected in series, three different lighting levels can be obtained. First, both lamps may be shut down completely such that no light is emitted at all. Second, both lamps may be turned on completely such that a maximum amount of light is emitted. Third, the fluorescent lamp may be turned on and the LED tube according to the present invention may be short circuited, i.e. the LED array thereof may be short circuited, such that the LED tube is not emitting any light. In this third case, the total amount of light emitted by the system is roughly fifty percent. The above is called step-dimming and may be extended for a plurality of fluorescent lamps and LED tubes according to the present invention to create more intermediate levels between fully on and fully of.

Based on the above, the LED tube can be controlled in such a way that, based on a received dimming command, it short circuits the LED array in case a dimming output level is required.

The control unit is thus arranged to short circuit the LED array, using the controllable switch circuit, in case a certain dimming level is to be obtained, and is arranged to cancel the short circuited LED array in case no dimming level is to be obtained.

According to the present invention a short circuit provided by the controllable switch circuit is required to establish a current path through other fluorescent tubes and LED tubes in the lighting system, as all of these tubes are connected in series.

The retrofit LED tube comprises a power rectifier in order for the LED tube to be used as a replacement tube for a fluorescent tube. The power rectifier is arranged to receive an AC supply voltage at its input, to convert the AC supply voltage to a DC voltage, and to provide said DC voltage, at its output, to the LED array. Different type of rectifiers exist, each of which suitable to be used in the retrofit LED tube according to the present disclosure. For example, a half-wave rectification rectifier only allows the positive part of the AC supply voltage to pass, while blocking the negative part of the AC supply voltage. This is typically accomplished using a single diode. In another example, a full wave rectification rectifier converts the whole of the AC supply voltage to one of constant polarity at its output. The positive part of the AC supply voltage is allowed to pass, and the negative part of the AC supply voltage is converted to a positive part. This may be accomplished using a bridge rectifier, or by using two diodes in combination with switches.

As mentioned above, a control unit is provided which is arranged for wirelessly receiving a dimming command and for controlling said controllable switch circuit based on the received dimming command. Thus, the control unit uses the dimming command as an input for determining whether the LED array should be short circuited or not. As such the dimming command may be a simple command providing either a "1" or a "0" indicating whether the LED array should be short circuited or not.

The control unit may be any type of hardware such as a microprocessor, a micro controller, a Field Programmable Gate Array, FPGA, or anything alike. The control unit may be empowered via the AC supply voltage, via the same or another rectifier, or may be empowered using an auxiliary power supply such as a battery.

Summarizing the above, the LED tube, more specifically the control unit, is arranged to switch between the ON and OFF state based upon the dimming command received. When the lamp is to be in the OFF state, the control unit switches it to near-zero impedance and the LED tube acts as a shunt, i.e. it lets the current to flow, does not generate any light and does not consume or hardly consumes any power.

It is noted that, in accordance with the present invention, the controllable switch circuit can be arranged at different places in the LED tube. These are described using the following embodiments.

In an embodiment, the controllable switch circuit is arranged in between said power rectifier and said LED array such that the controllable switch circuit is arranged to short circuit said output of said power rectifier.

In a detailed example hereof, the LED tube further comprises a storage capacitor placed in parallel over said LED array, and comprises a further rectifier having an input and an output, wherein said input of said further rectifier is connected to said output of said power rectifier, and wherein said output of said further rectifier is connected to said storage capacitor, wherein said storage capacitor is arranged to prevent depletion of said storage capacitor when said controllable switch circuit is short circuiting said LED array.

In another embodiment said power rectifier comprises two power rectifying diodes and two controllable power rectifier switches, wherein said controllable switch circuit is formed by said two controllable power rectifier switches, wherein said two controllable power rectifier switches are arranged to short circuit said LED array when both of said two controllable rectifier switches are closed.

In a detailed example hereof both outputs of said two power rectifying diodes are connected to each other, wherein inputs of said two power rectifying diodes are connected to a first connection of said input of said power rectifier and to a second connection of said input of said power rectifier, respectively, and wherein said two controllable rectifier switches are connected at one side to said LED array, and, at another side to said first connection of said input of said power rectifier and to said second connection of said input of said power rectifier, respectively.

In an embodiment any of said switches comprises a Metal Oxide Semiconductor, MOS, Field Effect Transistor, FET.

In a further embodiment, said controllable switch circuit is arranged at said input of said power rectifier such that said LED array is short circuited by short circuiting said AC supply voltage at said input of said power rectifier.

In yet another embodiment, said controllable switch circuit comprises a relay. In an embodiment, said control unit is empowered via the storage capacitor, wherein said control unit is further arranged to:

1) determine that a voltage over said storage capacitor is below a predetermined depletion threshold;
2) based on said determination that said voltage is below a predetermined depletion threshold, temporarily controlling said controllable switch circuit to not short circuit said LED array such that said storage capacitor is able to charge.

In an even further embodiment, said control unit is arranged to perform step 2) for a predetermined amount of time.

In an embodiment, the control unit is arranged to perform step 2) until said voltage is above a predetermined storage threshold.

In a second aspect of the invention, there is provided a multi lamp luminaire lighting system, comprising:
  a high frequency electronic ballast,
  at least one fluorescent tube, and
  at least one retrofit LED tube according to any of the previous claims, wherein said at least one LED tube and said at least one fluorescent tube are connected in series.

It is noted that the advantages and definitions as disclosed with respect to the embodiments of the first aspect of the invention, being the retrofit LED tube, also correspond to the embodiments of the second aspect of the invention, being the multi lamp luminaire lighting system, respectively.

In an embodiment, the lighting system comprises:
  a dimmer switch arranged for setting, by a user, a dimming command and arranged for wirelessly transmitting said a dimming command to any of said control unit comprised by said at least one retrofit LED tube.

The dimmer switch may be a battery powered switch which can be mounted on a wall or the like. In such a case, the dimmer switch merely transmits the dimming command to the control unit of the retrofit LED tube. The dimmer switch may be mounted using screws or adhesive tape or the like.

Alternatively, the dimmer switch may be installed in such a way that it switches a power line from the main power supply to the retrofit LED tube. That is, the dimmer switch is arranged to "turn-on" the LED tube by ensuring that the power line is connected from the main power supply to the LED tube, and the dimmer switch is arranged to "turn-off" the LED tube by ensuring that the power line between the main power supply and the LED tube is interrupted. Further, the dimmer switch is designed in such a way that a user can input its desired dimming command, and that the inputted dimming command is wirelessly transmitted to the control unit comprised by the LED tube.

In yet another alternative, the functionality of the dimmer switch may be implemented as an application "app" on a mobile device, such as a mobile phone or a tablet. That is, the mobile device is arranged to receive, via a touch screen, a desired dimming command for the LED tube, and is arranged to transmit the desired dimming command to the control unit of the LED tube.

The control unit may comprise a receiver for receiving the dimming command. The wirelessly transmitted dimming command may comprise any of a radio or radio-frequency, RF, signal or an infra-red, IR, signal, for example, operated in accordance with a standardized or proprietary signaling protocol. In practice, wireless radio transmission technologies available for use with the invention are, inter alia, ZigBee™, Bluetooth™, WiFi based protocols, or any Mesh type of wireless network.

In a third aspect of the invention, there is provided a method of operating a retrofit LED tube according to any of the embodiments as provided above, wherein said method comprises the steps of:

wirelessly receiving, by said control unit, a dimming command being a command to not emit light by said LED array;

controlling, by said control unit, said controllable switch circuit such that said LED array is short circuited such that the LED array does not emit light.

The method may be effectively performed by a suitably programmed processor or programmable controller, such as a microprocessor or microcontroller provided with the solid-state light source.

These and other aspects of the invention will be apparent from and elucidated with reference to the embodiment(s) described hereinafter.

DETAILED DESCRIPTION

Figure 1:
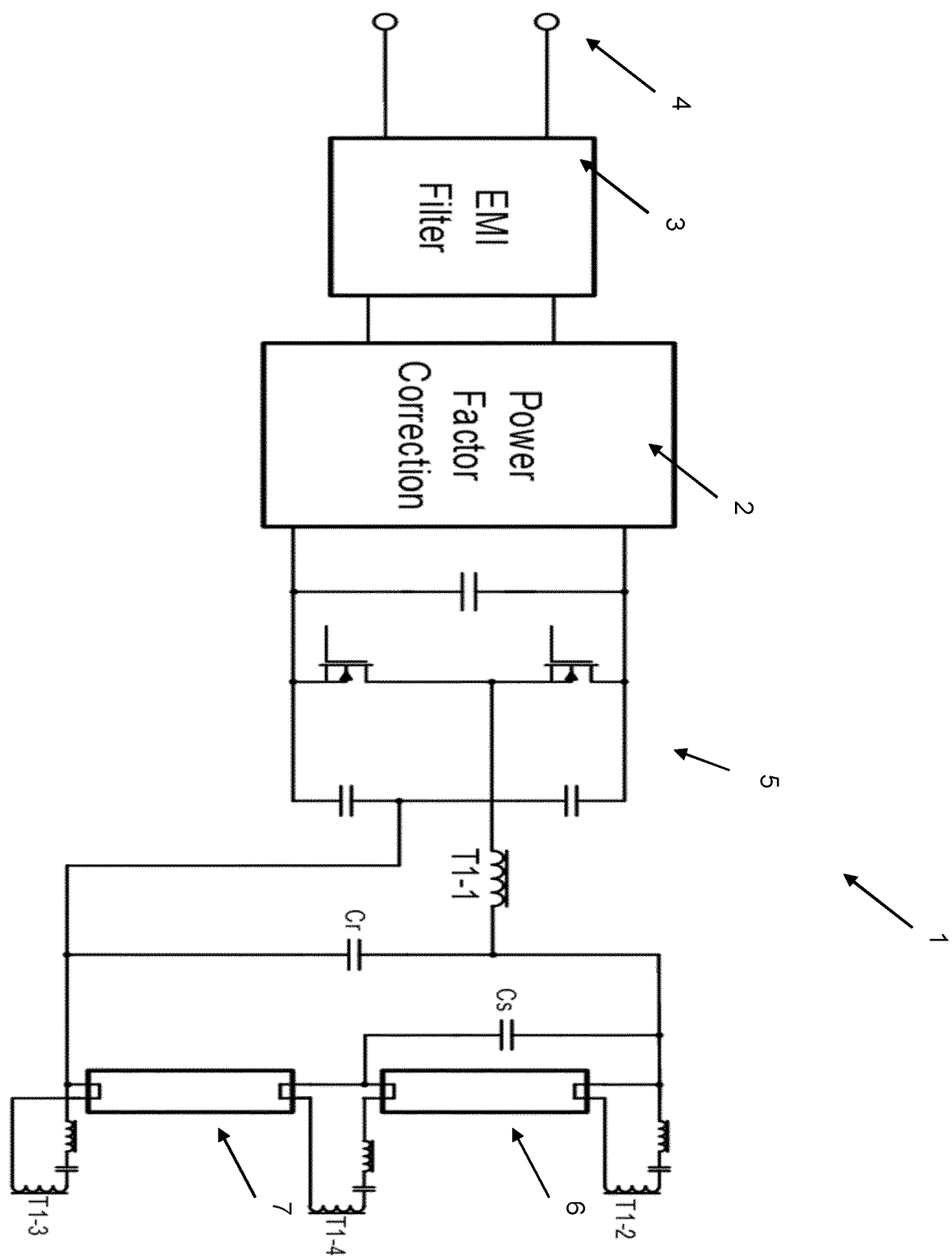
FIG. 1 shows an electrical circuit diagram of an example of a multi lamp luminaire lighting system according to the prior art.

Reference 1 in FIG. 1 designates a multi lamp luminaire lighting system in accordance with the prior art. Here a high frequency electronic ballast comprises an Electromagnetic Interference, EMI, filter 3, a Power Factor Correction, PFC, input stage and a resonant output stage 5. The EMI filter is, at its input 4, connected to the mains of, for example, a building.

Different implementations of the high frequency electronic ballast are available nowadays. The PFC stage 2 is typically a boost converter, a flyback converter or anything alike. The output stage 5 is dominated by a half-bridge inductor-capacitor, LC, resonant circuit. The control of the resonant output stage 5 may be performed by an Integrated Circuit, IC, or by a self-oscillating circuit.

The output of the high frequency electronic ballast is a current source and the lamps 6, 7 are often connected in series and, thus, driven from the same current.

One of the downsides of such a multi lamp luminaire lighting system is related to dimming. The power factor correction stage 2 of the high frequency electronic ballast will get instable, in case one of the lamps are dimmed, or both lamps are dimmed, below a certain amount of light level. The known ballasts are, namely, not designed to function in an open circuit, i.e. without a lamp connected to it. In addition, it is difficult with these known ballasts to enter a stand-by mode for all loads running in idle state. The reasons is that the ballast has open and short circuit protective circuitry.

Figure 2:
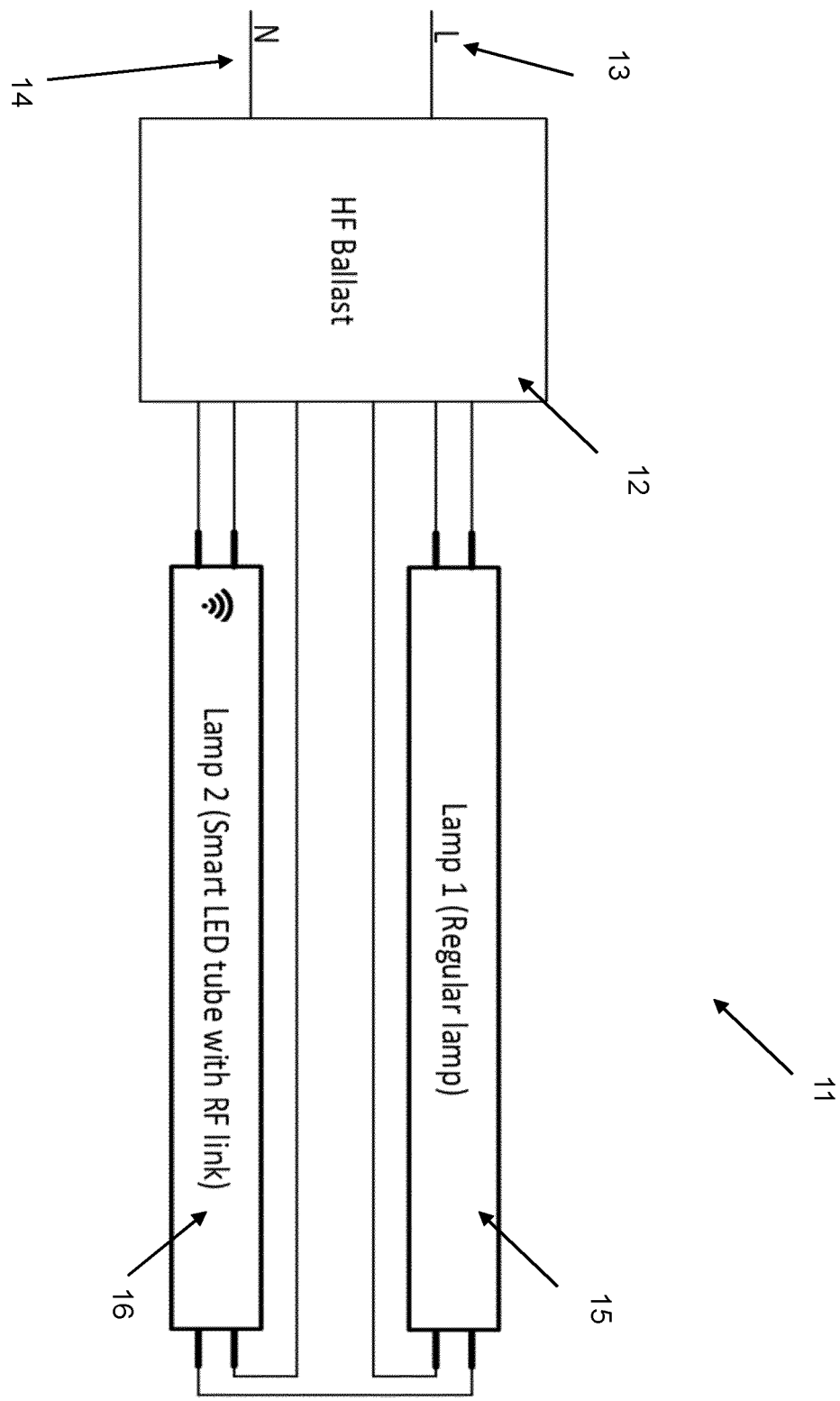
FIG. 2 shows an embodiment of a multi lamp luminaire lighting system according to the present invention.

FIG. 2 shows an embodiment of a multi lamp luminaire lighting system 11 according to the present invention.

The multi lamp luminaire lighting system 11 comprises a high frequency electronic ballast 12, at least one fluorescent tube 15, and at least one retrofit LED tube 16 according to any embodiments as described above, wherein said at least one LED tube 16 and said at least one fluorescent tube 15 are connected in series.

A fluorescent tube, or a fluorescent lamp, is already known in the art. Such a lamp is a low pressure mercury-vapour gas-discharge lamp that uses fluorescence to produce visible light. An electric current in the gas excites mercury vapor which produces short-wave ultraviolet light that then causes a phosphor coating on the inside of the lamp to glow.

Fluorescent lamp fixtures are more costly than incandescent lamps because they require the high frequency electronic ballast 12 to be present, which ballast 12 is arranged to regulate the current through the lamp 15.

The lighting system 11 may further comprise a dimmer switch (not shown) arranged for setting, by a user, a dimming command, and arranged for wirelessly transmitting the dimming command to the LED tube 16. The LED tube 16, more specifically the control unit comprised by the LED tube 16 will receive the dimming command and will dim the LED array of the LED tube 16 accordingly. This is explained in more detail with reference to FIGS. 3 to 6.

Figure 3:
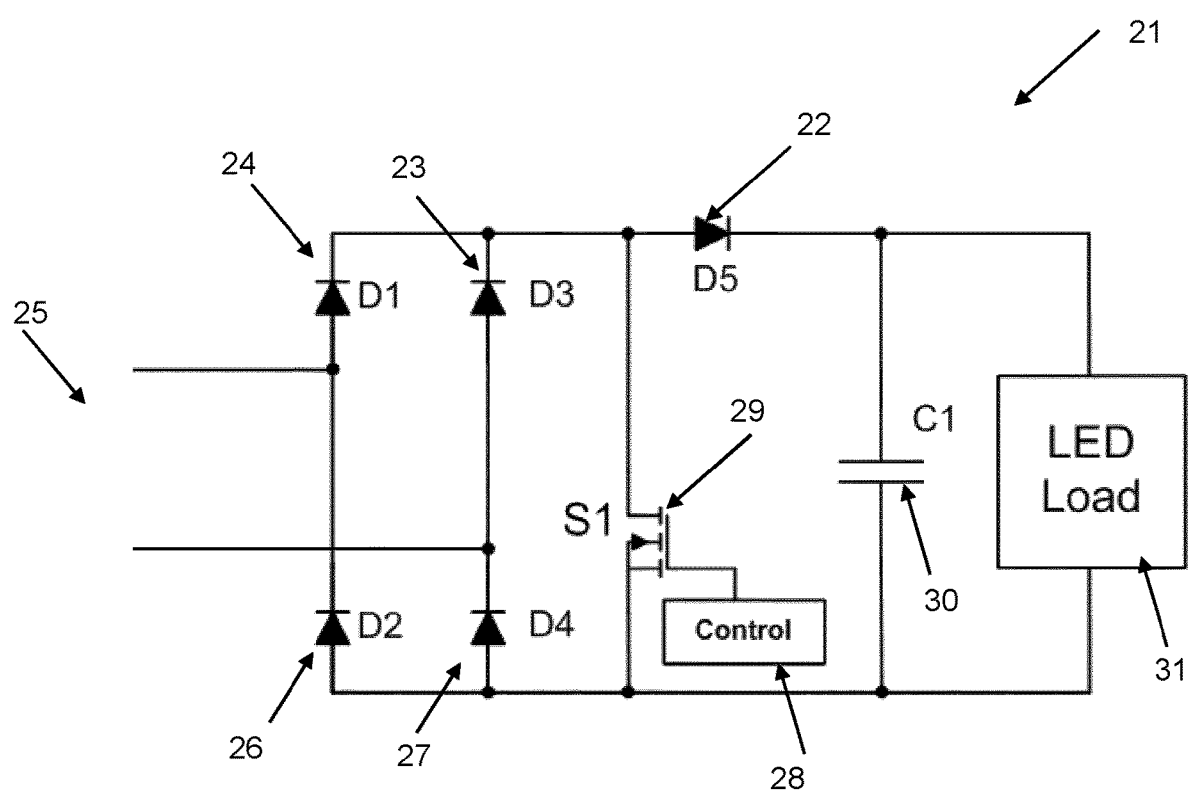
FIG. 3 shows an electrical circuit diagram of an example of a retrofit Light Emitting Diode, LED, tube according to the present invention.

Reference numeral 21 in FIG. 3 designates a retrofit Light Emitting Diode, LED, tube for enabling step dimming in a multi lamp luminaire lighting system, according to the present invention. A LED tube is retrofitted in case it fits in conventional armatures for fluorescent tubes, for example fluorescent tubes suitable for T5, T12 or anything alike. In order to fit in these conventional armatures, the retrofit LET tube 1 comprises conducting pens for connecting, and supporting, the retrofit LED tube 1 in the conventional armatures.

The retrofit LED tube 21 comprises an LED array 31, indicated as an LED load, for emitting light. The LED array 31 may comprise a plurality of series and parallel connected LED's. Those skilled in the art will appreciate that in practical embodiments the LEDs are evenly distributed and spaced apparat across the length of the tube 21, to provide for an as evenly as possible lighting by the LED tube 21 over its entire length. The present disclosure is not limited to any specific type of LED, nor to any color LEDs. Typically, white colored LEDs are used.

The LEDs are powered through a rectifier having an input and an output, wherein the rectifier is arranged to receive an AC supply voltage at its input 25, to convert the AC supply voltage to a DC voltage, and to provide, at its output, the DC voltage to the LED array 31.

The rectifier is shown, in FIG. 3, using the four diodes indicated with reference numerals 24, 23, 26, 27. The rectifier is arranged to receive an AC supply voltage at its input 25. The main power supply which is arranged to provide that AC supply voltage is not a part of the retrofit LED tube 1 and is not shown in FIG. 3. The high frequency electronic ballast is also not depicted in FIG. 3.

The working principle of the rectifier is as follows.

During a positive part of the AC supply voltage, the rectifying diode 24, the rectifying diode 22 as well as the rectifying diode 27 are all in their forward direction, meaning that current is flowing via that particular path through the LED array 31.

During a negative part of the AC supply voltage, the rectifying diode 26, the rectifying diode 22 as well as the rectifying diode 23 are all in their forward direction, meaning that current is flowing via that particular path through the LED array 31.

One of the aspects of the present invention is that a controllable switch circuit 29 is provided which is arranged to short circuit the LED array 31 such that the LED array 31 does not emit light. Further a control unit 28 is provided which is arranged for wirelessly receiving a dimming command and for controlling the controllable switch circuit 29 based on the received dimming command.

The above entails that the LED tube 21 shown in FIG. 3 can be disables by turning on the controllable switch circuit 29. As such, the LED array 31 is short circuited thereby preventing any light to be emitted while, at the same time, the current path is not interrupted. This is of importance as other tubes, for example LED tubes and/or fluorescent tubes, in the lighting system are connected in series to the LED tube 21 shown in FIG. 3. As the current path is not interrupted, all of these tubes will still function properly.

Using the controllable switch circuit 29 and the control unit 28, step-dimming is enabled in a multi lamp luminaire lighting system. Step-dimming is accomplished as at least one of the LED tubes, for example the LED tube shown in FIG. 3, can be switched on, or switched off, while the control thereof does not influence any of the other tubes in the lighting system. As such, the remainder of the tubes are able to still emit light even when the LED tube shown in FIG. 3 is turned off using the controllable switch circuit 29.

Based on the above, the LED tube 21 can be controlled in such a way that, based on a received dimming command, it short circuits the LED array 31 in case a dimming output level is required.

The control unit is thus arranged to short circuit the LED array 31, using the controllable switch circuit 29, in case a certain dimming level is to be obtained, and is arranged to cancel the short circuited LED array 31 in case no dimming level is to be obtained.

According to the present invention a short circuit provided by the controllable switch circuit is required to establish a current path through other fluorescent tubes and LED tubes in the lighting system, as all of these tubes are connected in series.

The control unit 28 is typically a microcontroller, a microprocessor, a Field Programmable Gate Array, FPGA, or anything alike. The control unit 28 may be equipped with a Radio Frequency receiver for receiving dimming commands from a dimmer switch. The control unit 28 may, as an alternative, be equipped with a transceiver for transmitting data to user devices, servers, dimmer switches, or anything alike. For example, the control unit 28 may transmit the actual dimming levels, via, for example, a WiFi connection, to an "app" on a mobile phone for indicating the status, to a user, of the dimming levels. In the present example, the control unit 28 is drawn as a single box. It is however conceivable that the control unit comprises one or more integrated circuits, for example one integrated circuit directed to the RF part of the control unit and one integrated circuit directed to the controlling of the controllable switch circuit 29.

Further an antenna may be comprised by the control unit 28 for increasing the wireless distance to a dimmer switch or a router. The antenna may be an external, or internal, antenna In order to be able to wirelessly receive the input dimming level. Typical transmission technologies that may be used for wirelessly transmitting the dimming commands comprise ZigBee™, Bluetooth™, WiFi based protocols, or any Mesh type of wireless network.

The present example is discussed with respect to an AC supply voltage of 230V, but may also operate in different kinds of AC supply voltages. Further, the present example is not limited to the specific rectifier or driver circuit as shown in FIG. 3. A skilled person is well aware of other types of rectifiers that are also suitable for empowering the LED's in the LED array 31. It is also noted that different kinds of dimming commands exist to actual short circuit the LED array 31, all of which are suitable to be used in accordance with the present invention.

In accordance with the present disclosure, a housing (not shown) may be provided for housing retrofit LED tube 21. More specifically, the housing may be arranged to house each of the components shown in FIG. 3. The housing may be a light transmissive housing or a partly light transmissive housing, configured as a retrofit tube type, for example.

In the present example, the control unit 28 is not powered by a separate battery, but is fed using the AC supply power, or using the storage capacitor 30.

The storage capacitor 30 is placed in parallel over said LED array 31. The LED tube 21 also comprises a further rectifier 22 having an input and an output, wherein said input of said further rectifier 22 is connected to said output of said power rectifier, and wherein said output of said further rectifier 22 is connected to said storage capacitor 30, wherein said storage capacitor is arranged to prevent depletion of said storage capacitor when said controllable switch circuit is short circuiting said LED array 31.

The above is an advantage in case the control unit 28 is empowered using the storage capacitor 30. The inventors have found that the depletion of the storage capacitor should be prevented in order for the control unit 28 to function properly. The control unit 28 should, in any case, be operative even when the LED array 31 is being short circuited. The control unit 28 should be able to receive dimming commands and should cancel the short circuiting, i.e. should open the controllable switch circuit 29, once a user has provided a corresponding dimming command.

The control unit 28 may be equipped with a safety mechanism such that the storage capacitor 30 will not run out of energy such that it will not be able to empower the control unit anymore.

The control unit 28 is then arranged to determine that a voltage over the storage capacitor 30 is below a predetermined depletion threshold, and is arranged to, based on the determination that said voltage is below a predetermined depletion threshold, temporarily control said controllable switch circuit 29 to not short circuit said LED array 31 such that said storage capacitor is able to charge.

Figure 4:
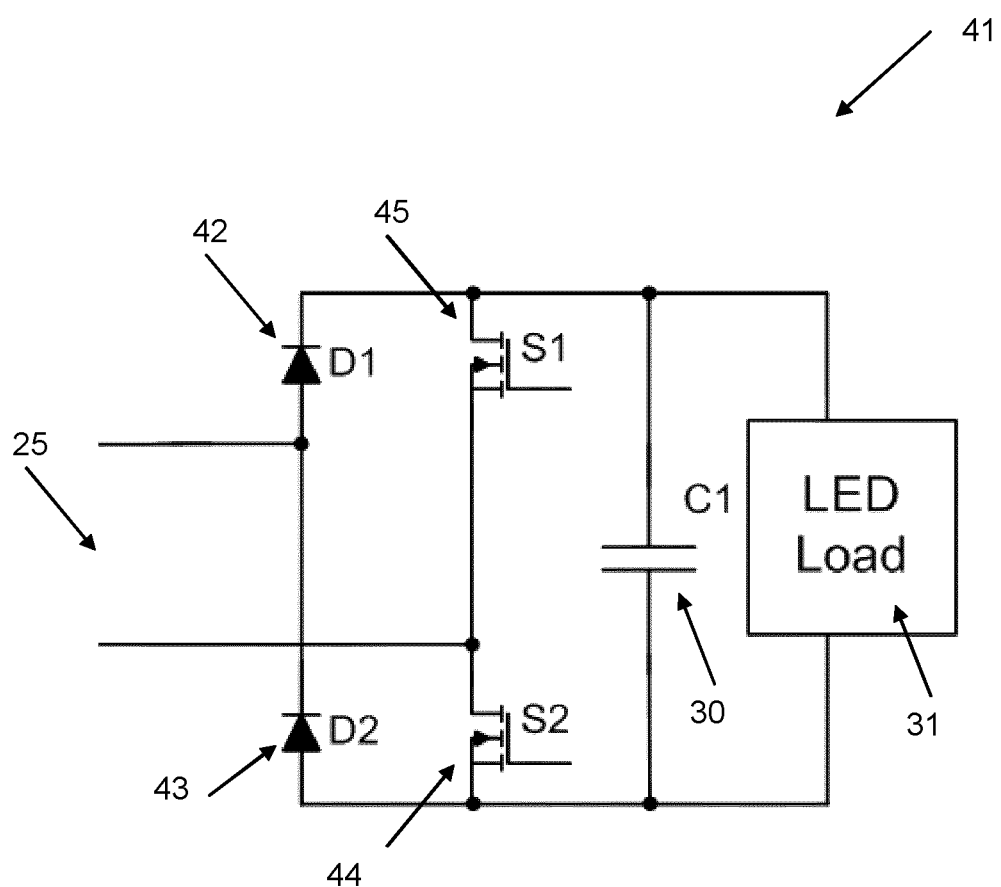
FIG. 4 shows an electrical circuit diagram of a further example of a retrofit Light Emitting Diode, LED, tube according to the present invention.

FIG. 4 shows an electrical circuit diagram 41 of a further example of a retrofit Light Emitting Diode, LED, tube 41 according to the present invention.

In the drawings, like reference numerals denote identical parts or parts performing an identical or comparable function or operation.

In the example shown in FIG. 4, the rectifier operates differently compared to the rectifier shown in FIG. 3. The rectifier in FIG. 4 is comprised by the two rectifying diodes 42, 43 as well as the two switches 44, 45. The two switched are also used, i.e. comprised by, the controllable switch circuit for short circuiting the LED array 31.

During the positive part of the AC supply voltage, the rectifying diode indicated with reference numeral 42 is in forward mode, i.e. it's conducting. The switch indicated with reference numeral 45 is open such that the current is flowing through the LED array 31. The rectifying diode indicated with reference numeral 43 is in reverse mode such that it will not conduct any current. The switch indicated with reference numeral 44 is closed, thereby ensuring that a current path is established through the LED array 31 during the positive part of the AC supply voltage.

During the negative part of the AC supply voltage, the rectifying diode indicated with reference numeral 43 is in forward mode, i.e. it's conducting. The switch indicated with reference numeral 44 is open such that the current is flowing through the LED array 31. The rectifying diode indicated with reference numeral 42 is in reverse mode such that it will not conduct any current. The switch indicated with reference numeral 45 is closed, thereby ensuring that a current path is established through the LED array 31 during the negative part of the AC supply voltage.

The two switches indicated with reference numerals 44 and 45 are being controlled by the control unit according to the present invention.

The control unit may be equipped with a synchronization circuit for detecting the transitions of the AC supply voltage. That is, the synchronization circuit is able to detect the current state of the AC supply voltage, i.e. whether the voltage state is positive or negative. This information is used, by the control unit, to correctly, and timely, control the switches indicated with reference numerals 44 and 45.

Typically, during normal operation, the switches indicated with reference numeral 44 and 45 are not closed and/or opened at the same time. However, in case the user has indicated that a certain dimming level is to be obtained, using the dimming command, the control unit may decide to close both switches indicated with reference numeral 44 and 45. This ensures that the LED array 31 is short circuited. During a positive part of the AC supply voltage, the short circuit is obtained using the switch indicated with reference numeral 45 and during a negative part of the AC supply voltage, the short circuit is obtained using the switch indicated with reference numeral 44.

Figure 5:
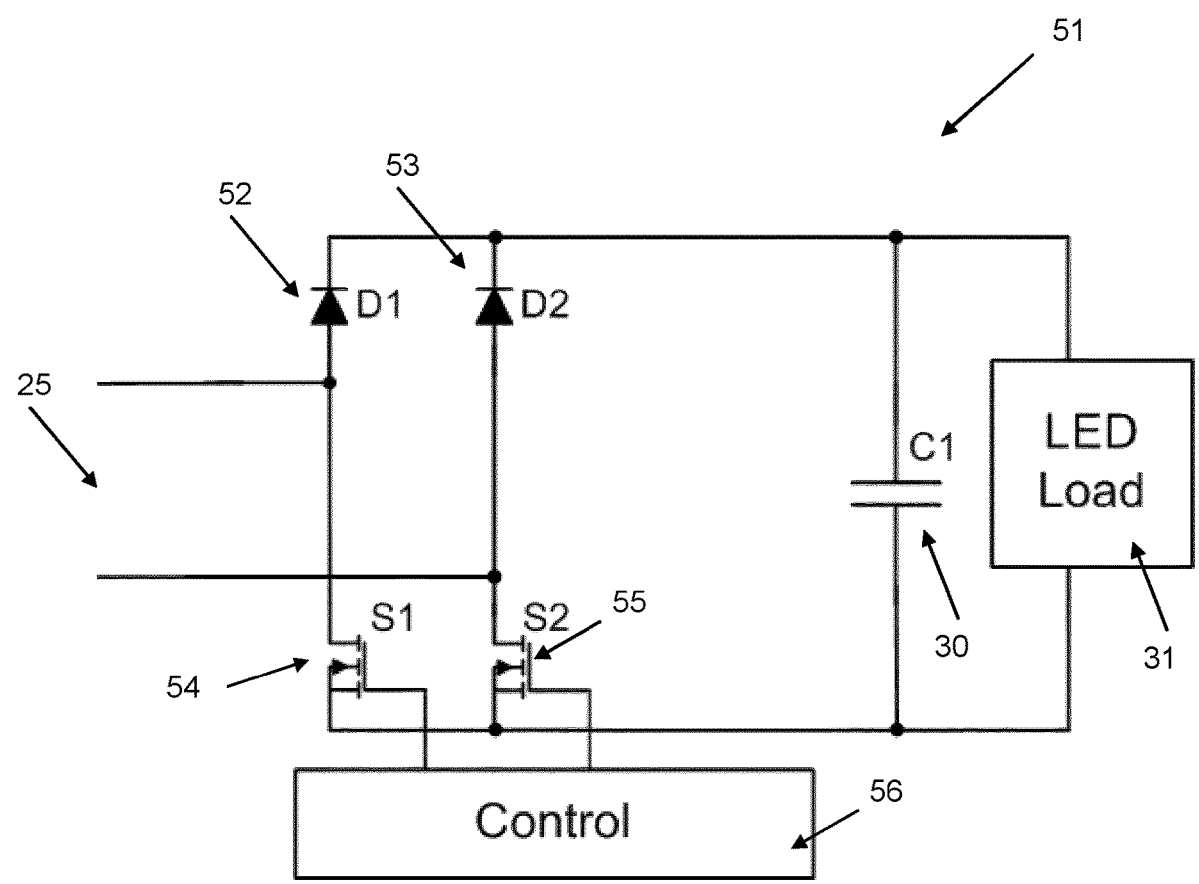
FIG. 5 shows an electrical circuit diagram of another example of a retrofit Light Emitting Diode, LED, tube according to the present invention.

FIG. 5 shows an electrical circuit diagram 51 of another example of a retrofit Light Emitting Diode, LED, tube 51 according to the present invention.

Here, both outputs of said two power rectifying diodes 52, 53 are connected to each other, wherein inputs of said two power rectifying diodes are connected to a first connection of said input 52 of said power rectifier and to a second connection of said input 52 of said power rectifier, respectively, and wherein said two controllable rectifier switches 54, 55 are connected at one side to said LED array 31, and, at another side to said first connection of said input 52 of said power rectifier and to said second connection of said input 52 of said power rectifier, respectively.

A control unit 56 is provided which is arranged to control both switched 54, 55 during normal operation, i.e. when the LED array 31 is supposed to emit light, and is arranged to short circuit the LED array 31, using the switches 54, 55, if required.

In order to short circuit the LED array 31, the control unit will close both switches 54, 55, at the same time to ensure that a direct, low ohmic, current path is established between the two connections of the input 25. The advantage of this example is that losses in the rectifying diodes 52, 53 are prevented, as the current does not flow through any of these rectifying diodes 52, 53 during the short circuiting of the LED array 31.

Any of the above mentioned switches may comprise a Metal Oxide Semiconductor, MOS, Field Effect Transistor, FET or a relay or anything alike.

Figure 6:
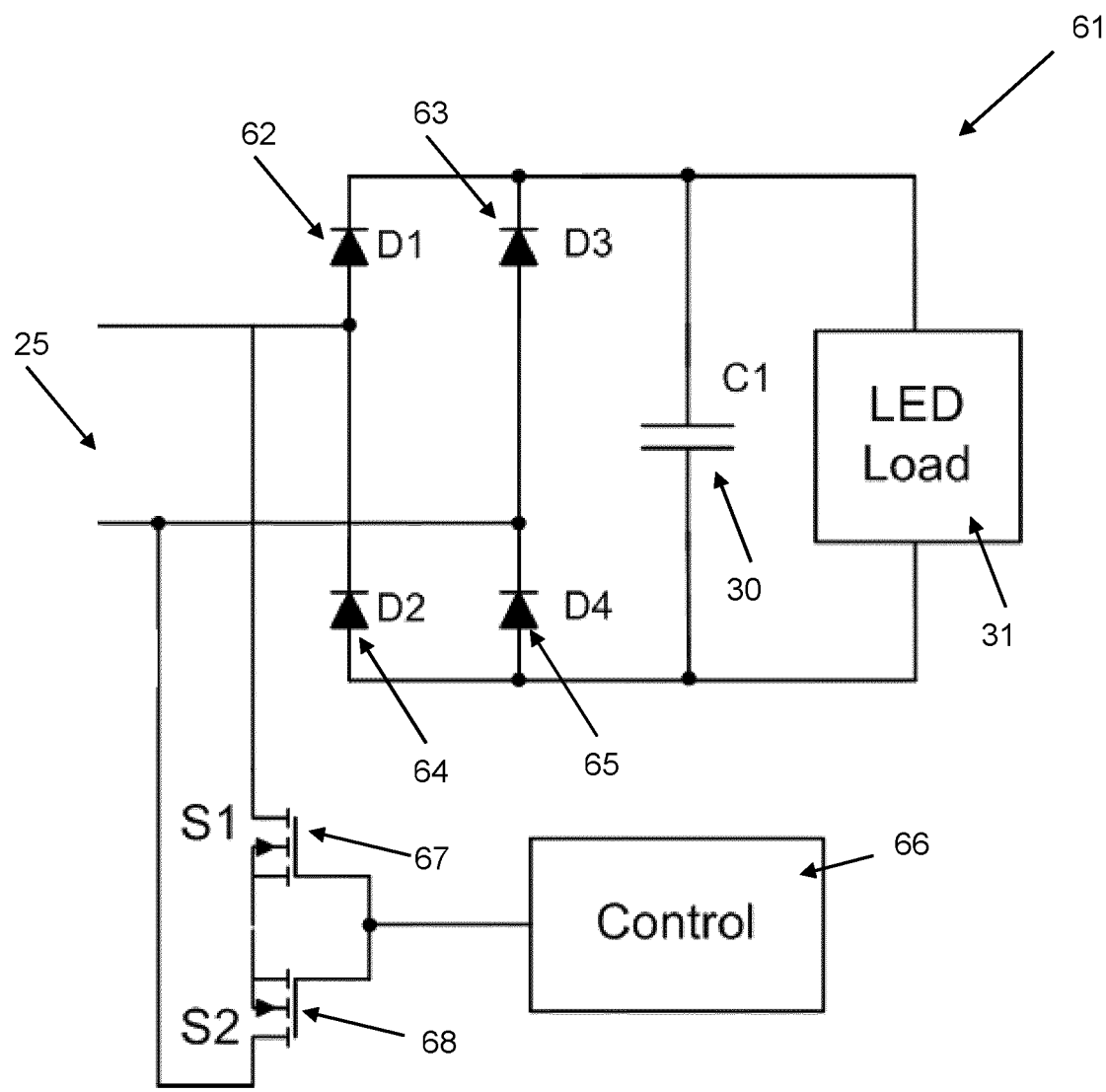
FIG. 6 shows an electrical circuit diagram of yet another example of a retrofit Light Emitting Diode, LED, tube according to the present invention.

FIG. 6 shows an electrical circuit diagram 61 of yet another example of a retrofit Light Emitting Diode, LED, tube 61 according to the present invention. Here, the controllable switch circuit, constituted by the switches indicated with reference numerals 67 and 68, are comprised in the AC part of the LED tube 61. That is, the switches 67 and 68 are arranged to short circuit the input of the power rectifier, wherein the power rectifier comprises the rectifying diodes indicated with reference numeral 62, 63, 64 and 65. The control unit 66 is provided to control the two switches 67 and 68.

Figure 7:
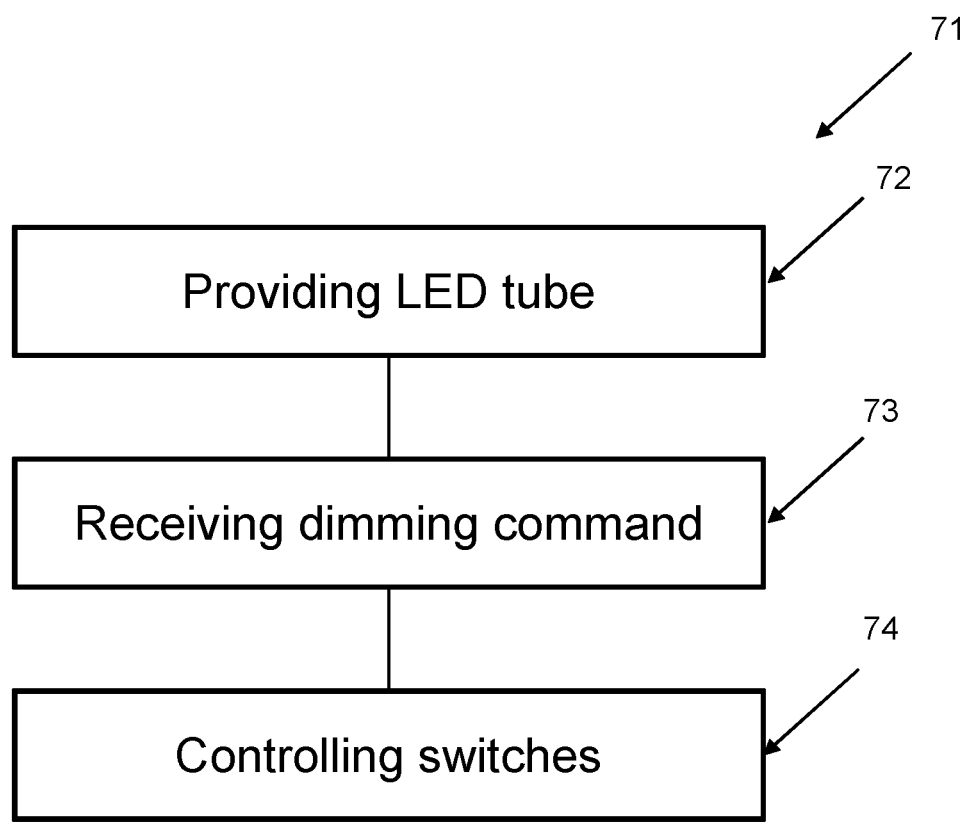
FIG. 7 shows a simplified flow chart diagram illustrating an example of the steps performed in accordance with an embodiment of the invention.

FIG. 7 shows a simplified flow chart diagram 71 illustrating an example of the steps performed in accordance with an embodiment of the invention.

In a first step 72, a LED tube according to any of the above disclosed embodiments is provided. That is, the LED tube is provided in a multi lamp luminaire lighting system having at least two different lamps. At least one regular, known, fluorescent lamp is provided in the lighting system, and at least one LED tube according to the present invention is provided in the lighting system. At least some of these lamps are connected in series.

In a second step 73, the control unit is wirelessly receiving a dimming command, wherein the dimming command is a command to shut down the LED tube, i.e. to not emit light by the LED array of the LED tube.

This command may be received using a Zigbee protocol, a WiFi protocol like 802.11a/b/g or 802.11ac, a Bluetooth protocol or anything resembling such protocols.

The dimming command may be received from the dimmer switch, but may also be received from a user device like a tablet, smartphone or anything alike. In the latter, an "app" is to be provided on the smartphone for connection to the LED tube, more specifically to the control unit of the LED tube.

In a third step 74, the control unit controls the controllable switch circuit such that said LED array is short circuited such that the LED array does not emit light.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or

The invention claimed is:

1. A retrofit Light Emitting Diode, LED, tube for use in a multi lamp luminaire lighting system arranged to be powered from a single high frequency electronic ballast, the retrofit LED tube, comprising:
   an LED array for emitting light;
   a power rectifier having an input and an output, wherein the rectifier is arranged to receive an AC supply voltage at its input, in use, to convert the AC supply voltage to a DC voltage, and to provide the DC voltage, via its output, to the LED array;
   a controllable switch circuit arranged to short circuit the LED array such that the LED array does not emit light;
   a control unit arranged for wirelessly receiving a dimming command and for controlling the controllable switch circuit based on the received dimming command;
   a storage capacitor placed in parallel over the LED array;
   a further rectifier having an input and an output, wherein the input of the further rectifier is connected to the output of the power rectifier, and wherein the output of the further rectifier is connected to the storage capacitor, wherein the storage capacitor is arranged to prevent depletion of the storage capacitor when the controllable switch circuit is short circuiting the LED array, wherein the control unit is empowered via the storage capacitor, wherein the control unit is further arranged to:
   1) determine that a voltage over the storage capacitor is below a predetermined depletion threshold;
   2) based on the determination that the voltage is below a predetermined depletion threshold, temporarily controlling the controllable switch circuit to not short circuit the LED array such that the storage capacitor is able to charge.

2. A retrofit LED tube according to claim 1, wherein said controllable switch circuit is arranged in between said power rectifier and said LED array such that the controllable switch circuit is arranged to short circuit said output of said power rectifier.

3. A retrofit LED tube according to claim 1, wherein said power rectifier comprises two power rectifying diodes and two controllable power rectifier switches, wherein said controllable switch circuit is formed by said two controllable power rectifier switches, wherein said two controllable power rectifier switches are arranged to short circuit said LED array when both of said two controllable rectifier switches are closed.

4. A retrofit LED tube according to claim 3, wherein both outputs of said two power rectifying diodes are connected to each other, wherein inputs of said two power rectifying diodes are connected to a first connection of said input of said power rectifier and to a second connection of said input of said power rectifier, respectively, and wherein said two controllable rectifier switches are connected at one side to said LED array, and, at another side to said first connection of said input of said power rectifier and to said second connection of said input of said power rectifier, respectively.

5. A retrofit LED tube according claim 1, wherein any of said switches comprises a Metal Oxide Semiconductor, MOS, Field Effect Transistor, FET.

6. A retrofit LED tube according to claim 1, wherein said controllable switch circuit is arranged at said input of said power rectifier such that said LED array is short circuited by short circuiting said AC supply voltage at said input of said power rectifier.

7. A retrofit LED tube according to claim 6, wherein said controllable switch circuit comprises a relay.

8. A retrofit LED tube according to claim 1, wherein said control unit is empowered via the storage capacitor, wherein said control unit is further arranged to:
   1) determine that a voltage over said storage capacitor is below a predetermined depletion threshold;
   2) based on said determination that said voltage is below a predetermined depletion threshold, temporarily controlling said controllable switch circuit to not short circuit said LED array such that said storage capacitor is able to charge.

9. A retrofit LED tube according to claim 8, wherein said control unit is arranged to perform step 2) for a predetermined amount of time.

10. A retrofit LED tube according to claim 8, wherein said control unit is arranged to perform step 2) until said voltage is above a predetermined storage threshold.

11. A multi lamp luminaire lighting system, comprising:
    a high frequency electronic ballast,
    at least one fluorescent tube, and
    at least one retrofit LED tube according to any of the previous claims, wherein said at least one LED tube and said at least one fluorescent tube are connected in series.

12. A lighting system according to claim 11, further comprising:
    a dimmer switch arranged for setting, by a user, a dimming command and arranged for wirelessly transmitting said dimming command to the control unit comprised by said at least one retrofit LED tube.

13. A method of operating a retrofit LED tube according claim 1, wherein said method comprises the steps of:
    wirelessly receiving, by said control unit, a dimming command being a command to not emit light by said LED array;
    controlling, by said control unit, said controllable switch circuit such that said LED array is short circuited such that the LED array does not emit light.

* * * * *